Figure 1:
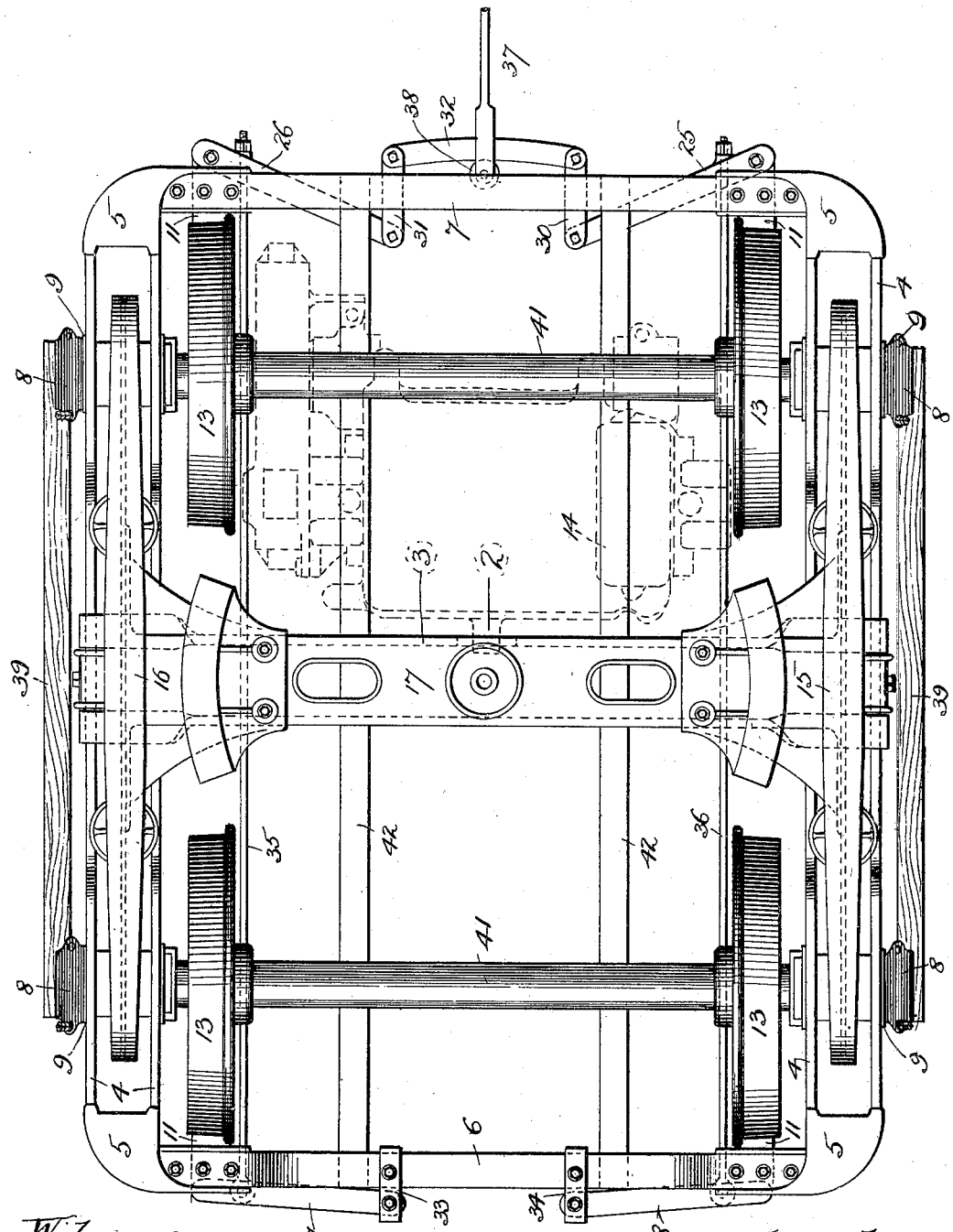

No. 628,954. Patented July 18, 1899.
W. A. McGUIRE & M. G. HUBBARD, Jr.
TRUCK FOR MOTOR CARS.
(Application filed May 7, 1897.)

(No Model.) 2 Sheets—Sheet 1.

No. 628,954. Patented July 18, 1899.
W. A. McGUIRE & M. G. HUBBARD, Jr.
TRUCK FOR MOTOR CARS.
(Application filed May 7, 1897.)
(No Model.) 2 Sheets—Sheet 2.
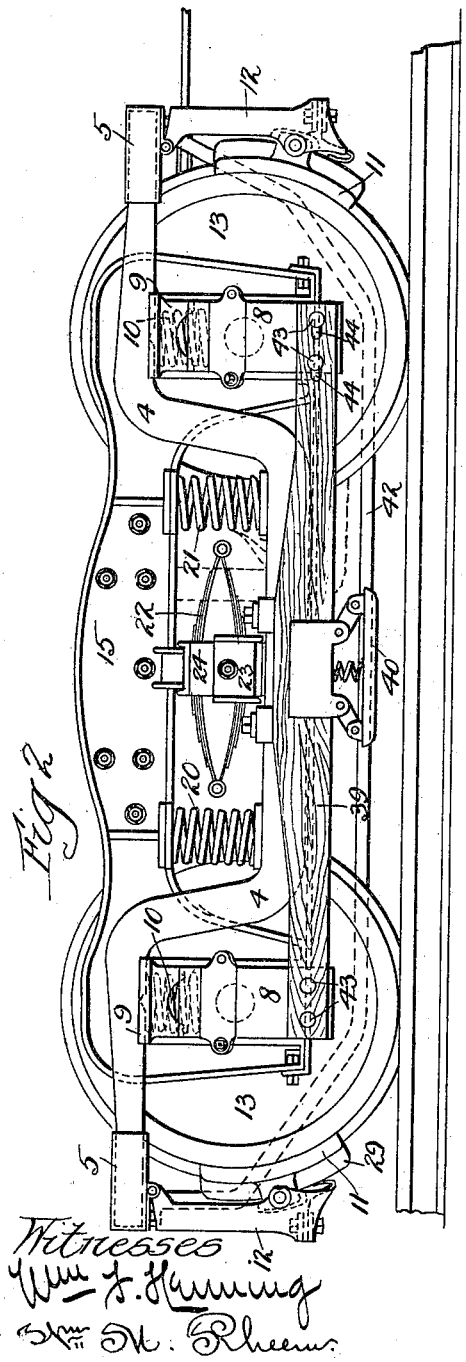
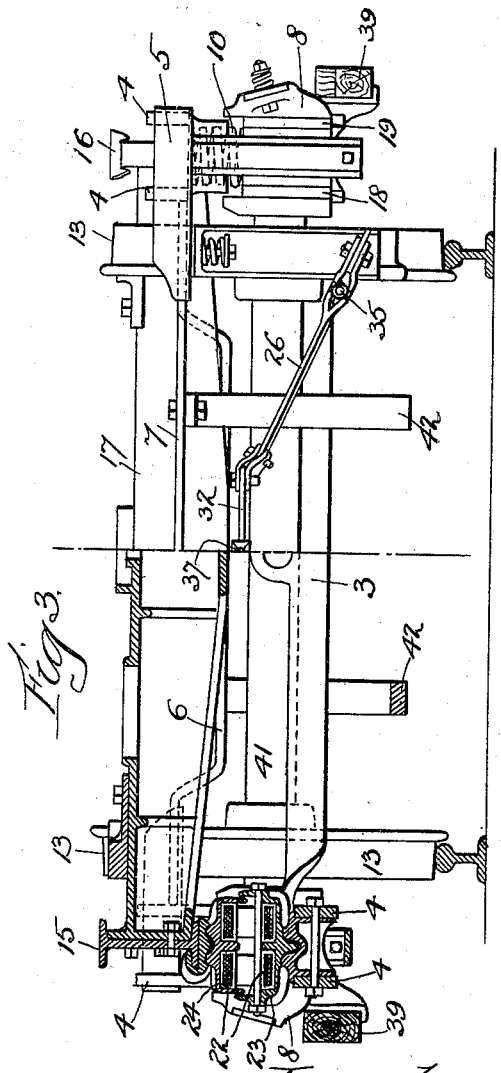

UNITED STATES PATENT OFFICE.

WILLIAM A. McGUIRE, OF CHICAGO, AND MOSES G. HUBBARD, JR., OF AUSTIN, ILLINOIS, ASSIGNORS TO THE McGUIRE MANUFACTURING COMPANY, OF CHICAGO, ILLINOIS.

TRUCK FOR MOTOR-CARS.

SPECIFICATION forming part of Letters Patent No. 628,954, dated July 18, 1899.

Application filed May 7, 1897. Serial No. 635,482. (No model.)

*To all whom it may concern:*

Be it known that we, WILLIAM A. McGUIRE, residing at Chicago, and MOSES G. HUBBARD, Jr., residing at Austin, Cook county, Illinois, citizens of the United States, have invented certain new and useful Improvements in Trucks for Motor-Cars, of which the following is a specification, reference being had to the accompanying drawings.

Our invention relates to trucks used for motor-cars, such as those commonly employed in elevated and suburban railway service. The requirements of trucks of this character differ from those of ordinary passenger coach or car trucks principally in the fact that while both must be so built that the car will be properly supported and will ride easily a motor-truck must draw the car after the manner of a locomotive, while the ordinary passenger-car truck must simply support the car, and to provide a motor-truck which will not only properly support the car, but will also be well adapted for drawing a single car or a train is the principal object of our present invention.

Our invention further contemplates providing improved brake mechanism, improved mechanism for supporting the car-body upon the truck, and means for supporting the motor in case of accidental breakage of the car-axle or other motor-supports; also, improved devices for carrying the contact-shoes, as will be more specifically hereinafter pointed out.

That which we regard as new will be set forth in the claims.

Referring to the accompanying drawings, Figure 1 is a plan view of a truck. Fig. 2 is a side elevation of the same; and Fig. 3 is an end view, part being in section.

Our improved truck is composed of four principal parts—to wit, the wheels and axles, an equalizer-frame mounted upon the axle journal-boxes, a car-body-supporting frame supported upon the equalizer-frame and the axle-journal boxes, and brake mechanism carried by the equalizer-frame. The equalizer-frame, as here shown, consists of double or bifurcated side members or equalizers 4 5, connected at their ends by end sills 6 7, as shown in Fig. 1, forming a substantially rectangular frame, which is supported by the axle journal-boxes 8 upon spring-seats 9 over springs 10. By thus supporting the equalizer-frame upon the springs the car is made to ride more easily; but the special advantage of such construction is that the parts of the frame are thereby cushioned and are prevented from jarring loose, and the dead-weight or non-elastic parts of the truck are thereby reduced to a minimum, diminishing the pounding upon the rails. The brake-shoes 11 are carried by links 12, which are suspended from the equalizer-frame, as shown in Fig. 2, opposite the wheels 13, so that the brake-shoes are practically unaffected by the movement of the car-body and do not transmit noise and jar to the car-body when the brake is applied. The motor 14 is also supported from the equalizer-frame, so that while it is independent of the movement of the car-body it is spring-supported. For this purpose the motor is provided with a trunnion or pin 2, which connects with a cross-bar 3 of the equalizer-frame, as shown in Figs. 1 and 3.

The car-body-supporting frame is composed of two side members 15 16, connected by a bolster 17, extending transversely of the truck. The side members 15 16 in the construction herein shown are provided with bifurcations near their ends, so that they fit over the axle journal-boxes, as shown in Fig. 2, resting upon the spring-seats 9, as shown. Such side members 15 16 at their ends are made sufficiently narrow, so that they may move laterally between ribs 18 19 formed on the sides of the journal-boxes 8, as shown at the right in Fig. 3, the members of the equalizers 4 5 being far enough apart to permit of independent lateral motion of the side members 15 16 of the car-body-supporting frame, as shown in Figs. 1 and 3.

20 21 indicate spiral springs between the side members 15 16 and their respective equalizers 4 5, as shown in Fig. 2, suitable spring-seats being provided for such springs. By this construction the side members 15 16 and the bolster 17 are elastically supported upon the equalizers. The bolster 17 is pivotally connected with the car-body in the usual manner.

From the foregoing description it will be seen that the car-body-supporting frame is laterally movable independently of the wheels and axle journal-boxes to the extent of the space between the ribs 18 19; but there is a rigid connection longitudinally between the axle journal-boxes and the center plate on the car-body, so that the points of draft correspond to those which have been found most efficient for locomotive service. The tendency of the car-body and car-body-supporting frame to move laterally on curves is elastically resisted and overcome and the car-body-supporting frame returned to its normal position by means of elliptic springs 22, arranged between rocker-plates 23 24, as shown at the left in Fig. 3, the arrangement being such that as the car-body-supporting frame moves laterally the springs 22 are compressed, and consequently such lateral movement resisted. The apparatus herein shown for resisting such lateral movement is the sole invention of Moses G. Hubbard, Jr., and forms the subject-matter of a separate application for patent. It is not believed to be necessary, therefore, to describe it more specifically herein.

Instead of using elliptic springs 22 other suitable springs may be used.

The brake-shoes 11 are operated by levers 25 26 27 28, respectively, which are pivoted to the brake-shoe backs 29, preferably to ears formed on such backs, and extend toward the center of the truck sufficiently to give the necessary leverage. At or near their inner ends the levers 25 26 are connected by links 30 31 through a curved equalizer-bar 32, and the levers 27 28 are connected by links 33 34, respectively, to the end sills 6. The levers 26 27 are connected by a connecting-rod 35 and the levers 25 28 by a connecting-rod 36, as shown in Fig. 1, so that when the levers 25 26 are operated the levers 27 28 will be similarly operated.

37 indicates a brake-rod which is provided with a bifurcated end, in which is mounted a roller 38, adapted to move on the concave surface of the equalizer 32. The rod 37 is connected with the source of power, so that by applying power to the rod 37 all the brakes may be operated. By providing the equalizer-bar 32 and loosely connecting the rod 37 to it, as above described, the free radial movement of the truck on curves is permitted without lengthening or shortening the brakes, thus forming a cheap and efficient brake mechanism, which surrounds the motor and does not interfere with it and is not affected by the movement of the car-body. If preferred, brake-beams may be used to connect the brake-shoes, the levers 25 26 27 28 being connected to said brake-beams, or various other modifications may be made; but the construction herein illustrated we consider the best form.

The motor-truck herein illustrated is designed particularly for use where the electric current is derived from a third rail, and to properly carry the mechanism for connecting with such third rail and to insulate it from the truck-frame a beam 39, of wood or other high electrical resistance material, is provided, which is attached to the axle journal-boxes 8, and in order that the beam 39 may not interfere with the proper action of the journal-boxes said beam is loosely connected to the journal-boxes by pins 43, passing through slots 44 in the beam 39, as shown in Fig. 2. The beam 39 carries the usual shoe 40.

In trucks of this character it sometimes happens that the motor-axle 41 is broken, and it has heretofore been considered impossible to provide for supporting the axle in case of breakage, and thereby avoid the serious delays and accidents which result from such breakage. We avoid the objections incident to prior constructions by providing means for utilizing the journals of the motors upon the axle for supporting the axle in case of breakage, such means consisting of supports designed to support the motor. As illustrated in the accompanying drawings, such supports consist of bars 42, preferably two in number, which are connected at their ends to the end sills of the equalizer-frame and extend under the motor at a short distance therefrom. By this construction should the axle break the motor would be supported by the bars 42 and the axle held up in position, so that the car could be removed without fear of further accident.

We have described our invention in detail; but we wish it to be understood that various modifications may be made without departing from it.

That which we claim as our invention, and desire to secure by Letters Patent, is—

1. In a pivotal car-truck, the combination of a frame spring-supported upon the axle journal-boxes, springs mounted upon said frame, and a laterally-movable car-body-supporting frame constructed to embrace the axle journal-boxes mounted upon said latter springs, substantially as described.

2. In a pivotal car-truck, a laterally-swinging bolster-frame constructed to embrace the axle journal-boxes, in combination with a frame spring-supported upon the axle journal-boxes upon which said bolster-frame is supported, substantially as and for the purpose specified.

3. In a pivotal car-truck, the combination with a car-body-supporting frame constructed to embrace the axle journal-boxes, of a second frame, said car-body-supporting frame being spring-supported upon the latter frame and having a vertical and lateral movement independently of said frame, substantially as described.

4. In a pivotal car-truck, the combination of a car-body-supporting frame consisting of side members and a bolster rigidly attached thereto, said car-body-supporting frame being connected to the axle journal-boxes and being substantially immovable longitudinally of the truck, and means for supporting said car-body-supporting frame and permitting vertical and lateral movement of said frame independently of the axle journal-boxes, substantially as described.

5. In a pivotal motor-truck, a laterally-swinging spring-supported bolster, in combination with longitudinally-rigid draft connections between said bolster and the axle journal-boxes, said draft connections being rigidly attached to said bolster, substantially as described.

6. In a pivotal motor-truck, a spring-supported laterally-swinging bolster, and a pair of side members rigidly attached thereto and constructed to embrace the axle journal-boxes, substantially as described.

7. In a car-truck, the combination of a frame spring-supported upon the axle journal-boxes, said frame consisting of side and end members, springs mounted upon said frame, and a car-body-supporting frame mounted on said latter springs and embracing the axle journal-boxes to prevent longitudinal movement of said car-body-supporting frame, substantially as described.

8. In a car-truck, the combination of side bars supported upon the axle journal-boxes, a car-body-supporting frame spring-supported on said side bars, and rockers for permitting a lateral movement of said supporting-frame in relation to said side bars, substantially as described.

9. In a car-truck, the combination of a laterally-movable bolster, draft connections rigidly connected to said bolster and constructed to move therewith, side bars supported on the axle journal-boxes, springs mounted on said side bars for supporting said bolster, and means for permitting a lateral movement of said bolster in relation to said side bars, substantially as described.

10. In a car-truck, the combination of a lower frame spring-supported on the axle journal-boxes, an upper or car-body-supporting frame consisting of a bolster and draft connections rigidly attached thereto, said upper frame being spring-supported on said lower frame and being movable laterally and vertically with relation to said lower frame, substantially as described.

11. In a car-truck, the combination of a lower frame spring-supported on the axle journal-boxes, a motor journaled on the truck-axle at one end and supported from said lower frame at its opposite end, and a laterally and vertically movable bolster spring-supported on said lower frame and adapted to move vertically and laterally in relation thereto, said bolster having draft connections rigidly attached to it and movable with it, substantially as described.

12. In a motor-car truck, the combination of a truck-frame and axle, a motor sleeved on the axle, and longitudinal bars attached to the truck-frame for supporting motor and axle in case of an axle breaking, substantially as and for the purpose specified.

13. In a motor-car truck, one or more safety-supports, consisting of longitudinal bars attached to the truck-frame and extending under the motors and axles, constructed to catch and support said motor and axle, in case the axle breaks, substantially as specified.

WILLIAM A. McGUIRE.
MOSES G. HUBBARD, Jr.

Witnesses:
JOHN L. JACKSON,
HOLMES A. TILDEN.